(12) United States Patent
Gover et al.

(10) Patent No.: US 11,473,464 B2
(45) Date of Patent: Oct. 18, 2022

(54) REMOVAL OF CONTAMINANTS FROM AIR FOR USE IN AIRCRAFT ENGINES

(71) Applicant: PRATT & WHITNEY CANADA CORP., Longueuil (CA)

(72) Inventors: Christopher Gover, Longueuil (CA); Guy Lefebvre, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 194 days.

(21) Appl. No.: 16/718,975

(22) Filed: Dec. 18, 2019

(65) Prior Publication Data

US 2021/0047953 A1 Feb. 18, 2021

Related U.S. Application Data

(63) Continuation-in-part of application No. 16/541,491, filed on Aug. 15, 2019.

(51) Int. Cl.
| | |
|---|---|
| *F01N 3/033* | (2006.01) |
| *B01D 45/16* | (2006.01) |
| *B01D 46/00* | (2022.01) |
| *B01D 53/82* | (2006.01) |
| *F02C 3/00* | (2006.01) |
| *F02M 23/14* | (2006.01) |
| *B01D 53/38* | (2006.01) |

(52) U.S. Cl.
CPC ............ *F01N 3/033* (2013.01); *B01D 45/16* (2013.01); *B01D 46/0027* (2013.01); *B01D 53/38* (2013.01); *B01D 53/82* (2013.01); *F02C 3/00* (2013.01); *F02M 23/14* (2013.01); *B01D 2258/06* (2013.01); *F05D 2220/323* (2013.01)

(58) Field of Classification Search
None
See application file for complete search history.

(56) References Cited

U.S. PATENT DOCUMENTS

| | | | |
|---|---|---|---|
| 4,158,449 A | 6/1979 | Sun et al. | |
| 7,634,984 B2 | 12/2009 | Stelzer et al. | |
| 8,961,634 B2 | 2/2015 | Boyce | |
| 9,492,780 B2 | 11/2016 | Taylor et al. | |
| 10,202,903 B2 | 2/2019 | Ahmadian et al. | |
| 2016/0045923 A1* | 2/2016 | Correia | F01D 11/08 55/392 |
| 2016/0123154 A1* | 5/2016 | Manning | F01D 5/147 416/90 R |
| 2017/0114720 A1* | 4/2017 | Stone | B01D 45/16 |
| 2017/0122202 A1* | 5/2017 | Rahaim | F02C 3/34 |
| 2017/0211475 A1* | 7/2017 | Mayer | F02C 7/052 |
| 2017/0341762 A1* | 11/2017 | Breigenzer | B01D 46/0027 |
| 2018/0291809 A1* | 10/2018 | Seo | F01D 5/081 |

* cited by examiner

*Primary Examiner* — Christopher P Jones
*Assistant Examiner* — Phillip Y Shao
(74) *Attorney, Agent, or Firm* — Norton Rose Fulbright Canada LLP

(57) ABSTRACT

A secondary air system for an aircraft engine comprises an air flow path communicating between a source of pressurized cooling air and an air consuming component. A filter is disposed in the air flow path upstream from the air consuming component. The filter has at least one of: openings of a size selected for capturing suspended particles; and a filter surface material for binding with chemical contaminants.

9 Claims, 7 Drawing Sheets

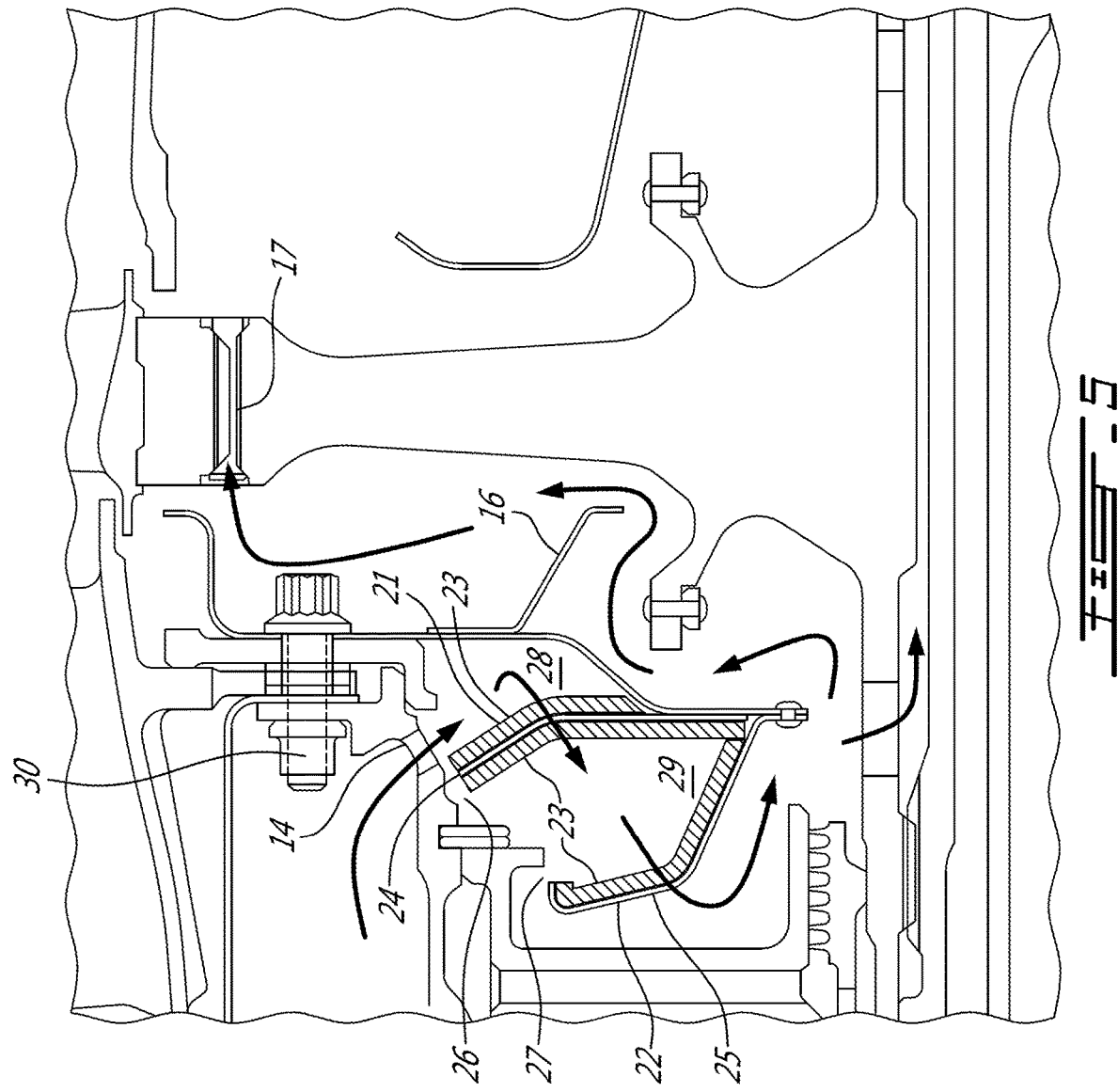

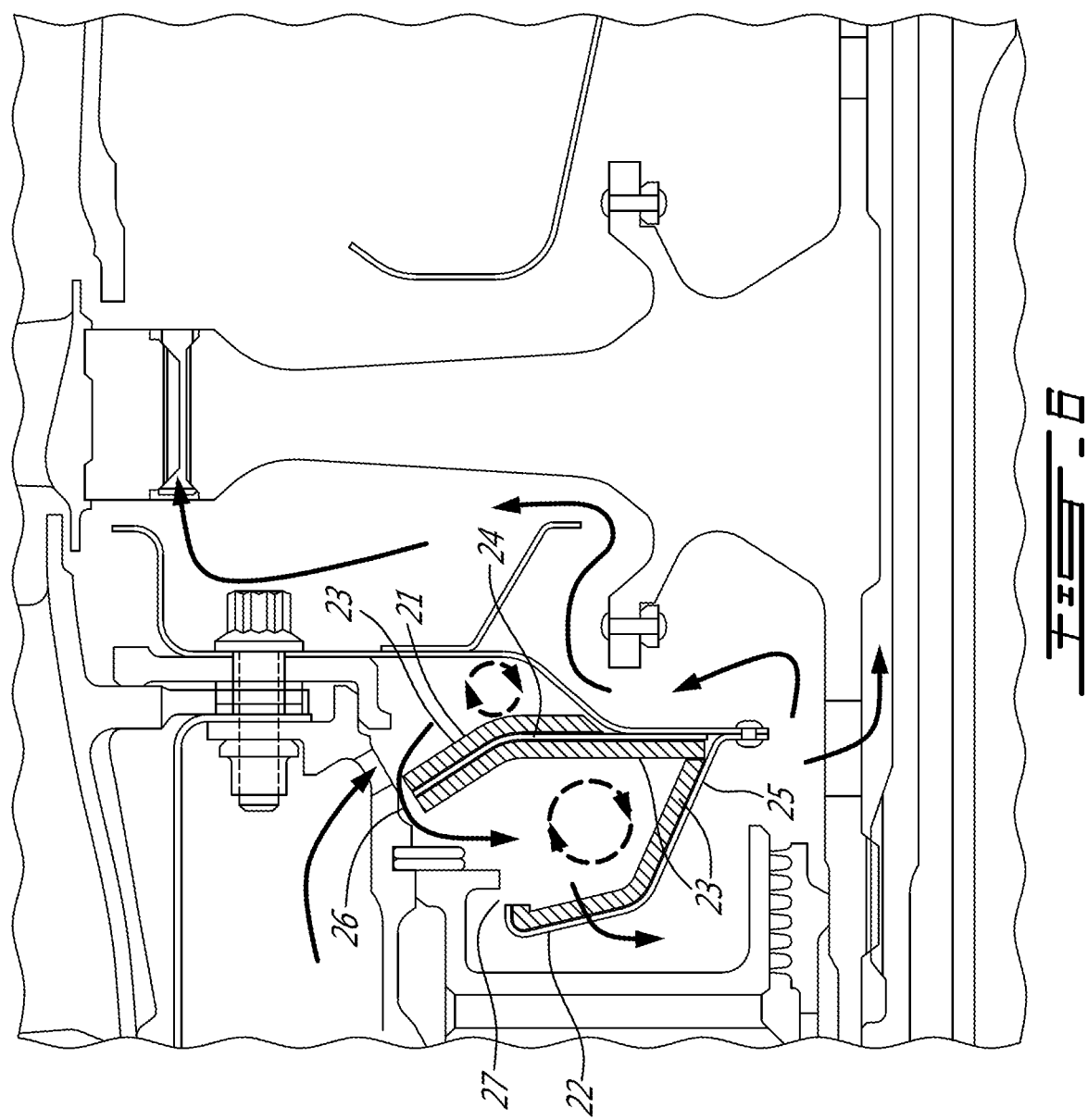

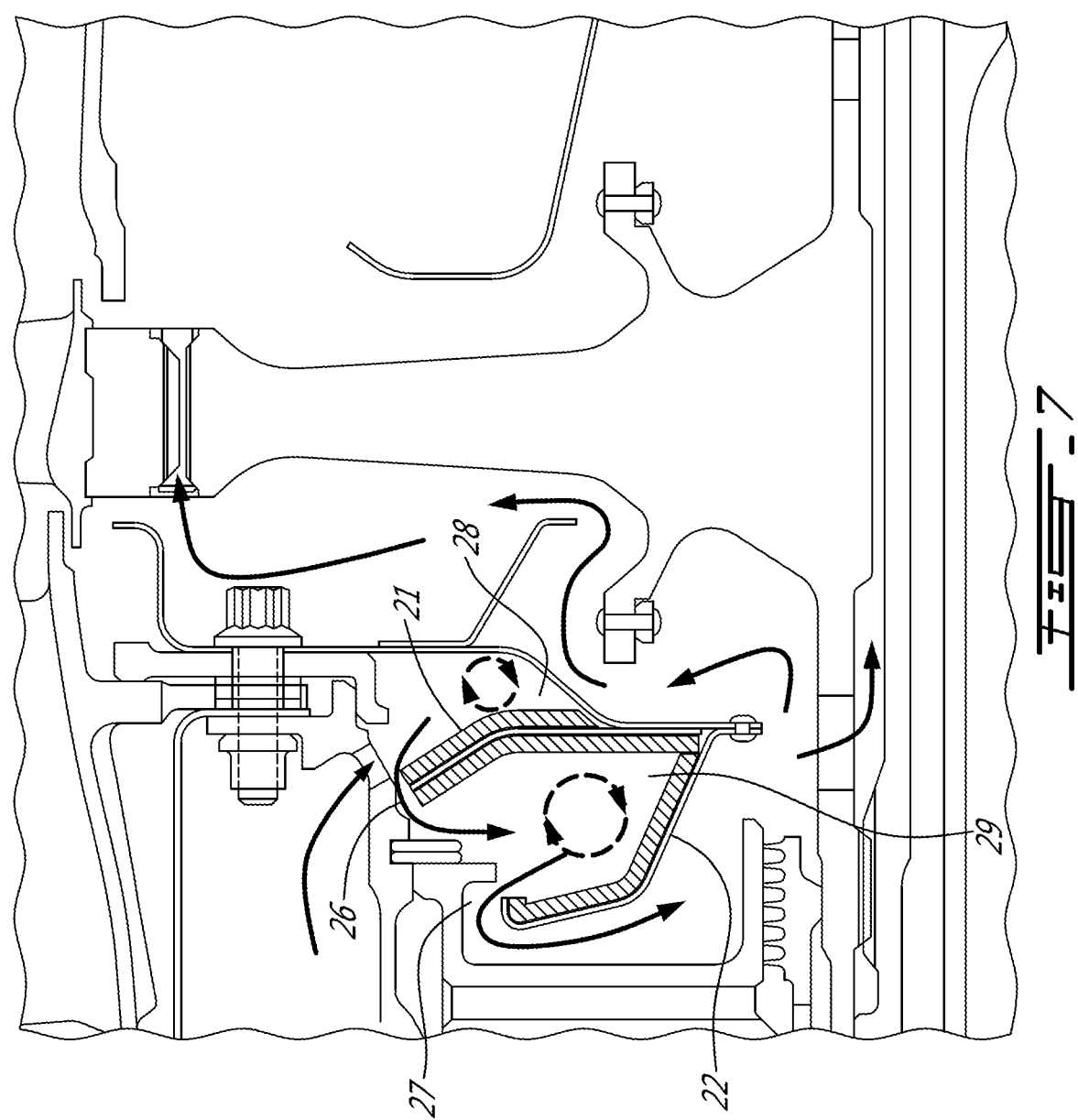

REMOVAL OF CONTAMINANTS FROM AIR FOR USE IN AIRCRAFT ENGINES

RELATED APPLICATION

This application is a continuation-in-part of U.S. application Ser. No. 16/541,491 filed Aug. 15, 2019, the entire content of which is incorporated by reference herein.

TECHNICAL FIELD

The application relates generally to a secondary air system (SAS) for aircraft engine and, more particularly, to an anti-contamination baffle with a particulate filter for filtering SAS air.

BACKGROUND OF THE ART

Gas turbine engines operate at temperatures above which many materials are unable to withstand. A solution used in the aerospace industry to overcome the material heat limitation is the use of pressurized cooling air generated by the compressor section of the engine. The cooling air passes around and through hotter components removing heat from them and allowing continued reliable operation using materials and metal alloys in demanding high temperature exposure conditions. The generation of compressed air and conveying the cooling air consumes energy. To reduce the effect of cooling air consumption on overall engine performance and fuel efficiency, the quantity of cooling air is generally kept to the minimum possible using small orifices and narrow cooling passages.

During standard operation, the cooling passages are typically sufficient for the purposes required. However, during operation in high contamination environments where large quantities of fine particulate matter is suspended in the surrounding air, these narrow passages can become clogged reducing or even blocking cooling air flow completely. While larger particles can be separated by centrifugal force in the air inlet duct, engaging the inlet fan and exhausted through a bypass duct, smaller suspended particles and chemical contaminants may continue to be carried into the engine core with the air flow into the compressor, combustor and turbine sections. The result of air passages blocked by accumulation of small suspended particles and chemical contaminants can include overheating of cooled components which lead to engine removal or overhaul, seal replacement, spare part consumption, or part failure. Improvement is thus desirable.

SUMMARY

In one aspect, there is provided a secondary air system (SAS) for a gas turbine engine comprising: an air flow path communicating between a core gas path of the gas turbine engine and an air consuming component; and a filter disposed in the air flow path upstream from the air consuming component, the filter having at least one of: openings of a size selected for capturing suspended particles; and a filter surface material for binding with chemical contaminants.

In another aspect, there is provided an aircraft engine comprising: a core gas path having an air inlet; a compressor fluidly connected to the air inlet of the core gas path; a turbine fluidly connected to the compressor via the core gas path; a secondary air system (SAS) having an air flow path communicating between the compressor and the turbine; and a filter disposed in the air flow path upstream from the turbine, the filter having at least one of: openings of a size selected for capturing suspended particles; and a filter surface material for binding with chemical contaminants.

In accordance with another aspect, there is provided a method for removing fine particulate matter and chemical contaminants from secondary air in an aircraft engine, the fine particulate matter and chemical contaminants being suspended in a core air flow passing through a core engine gas path; the method comprising: bleeding core air from the core air flow path to provide secondary air, trapping the fine particulate matter and chemical contaminants by filtering the secondary air through a filter disposed inside the aircraft engine upstream of an air consuming component.

Further details of these and other aspects of the subject matter of this application will be apparent from the detailed description included below and the drawings.

DESCRIPTION OF THE DRAWINGS

Reference is now made to the accompanying figures.

FIGS. 5, 6 and 7 are axial cross-sectional view of a cooling air filter showing the changes in cooling air flow that occur when the filter medium becomes progressively blocked with suspended fine particulate matter and chemical contaminants, namely: when fully clear; with a blocked upstream filter panel; and with blocked downstream and upstream filter panels, respectively.

DETAILED DESCRIPTION

Figure 1:
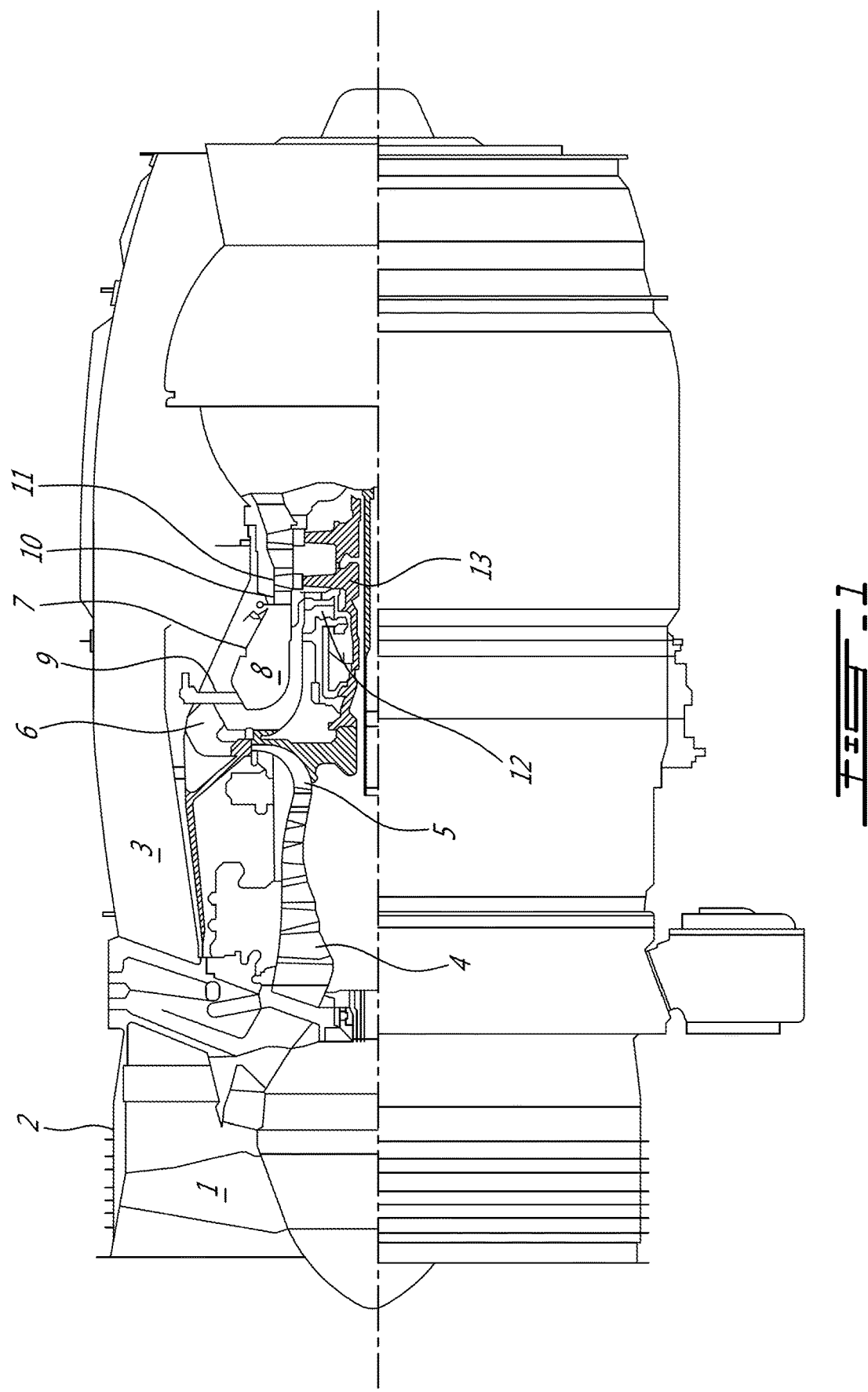
FIG. 1 is a schematic axial cross-sectional view of an example gas turbofan engine.

FIG. 1 shows an axial cross-section through an aircraft engine. According to the illustrated embodiment, the aircraft engine is a turbo-fan gas turbine engine. However, it is understood that the aircraft engine could adopt various other forms, such as a turboshaft, a turboprop or an engine used for electric power generation. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor section through a diffuser 6 and is contained within a plenum 7 that surrounds the combustor 8. Fuel is supplied to the combustor 8 through fuel tubes 9 and fuel is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling the turbines to eventually mix with the hot gases from the combustor and pass over the nozzle guide vane 10 and turbine blades 11 before exiting the tail of the engine as exhaust.

The present description and drawings relate to the secondary air flow generated by the compressors 4-5 and conveyed to a secondary air system (SAS) for various engine functions and aircraft cabin pressure. Main functions of SAS are to provide cooling flow to hot engine components, to seal bearing chambers and to control bearing axial loads The example shown in FIGS. 2-7 relates to cooling and/or sealing air.

Figure 2:
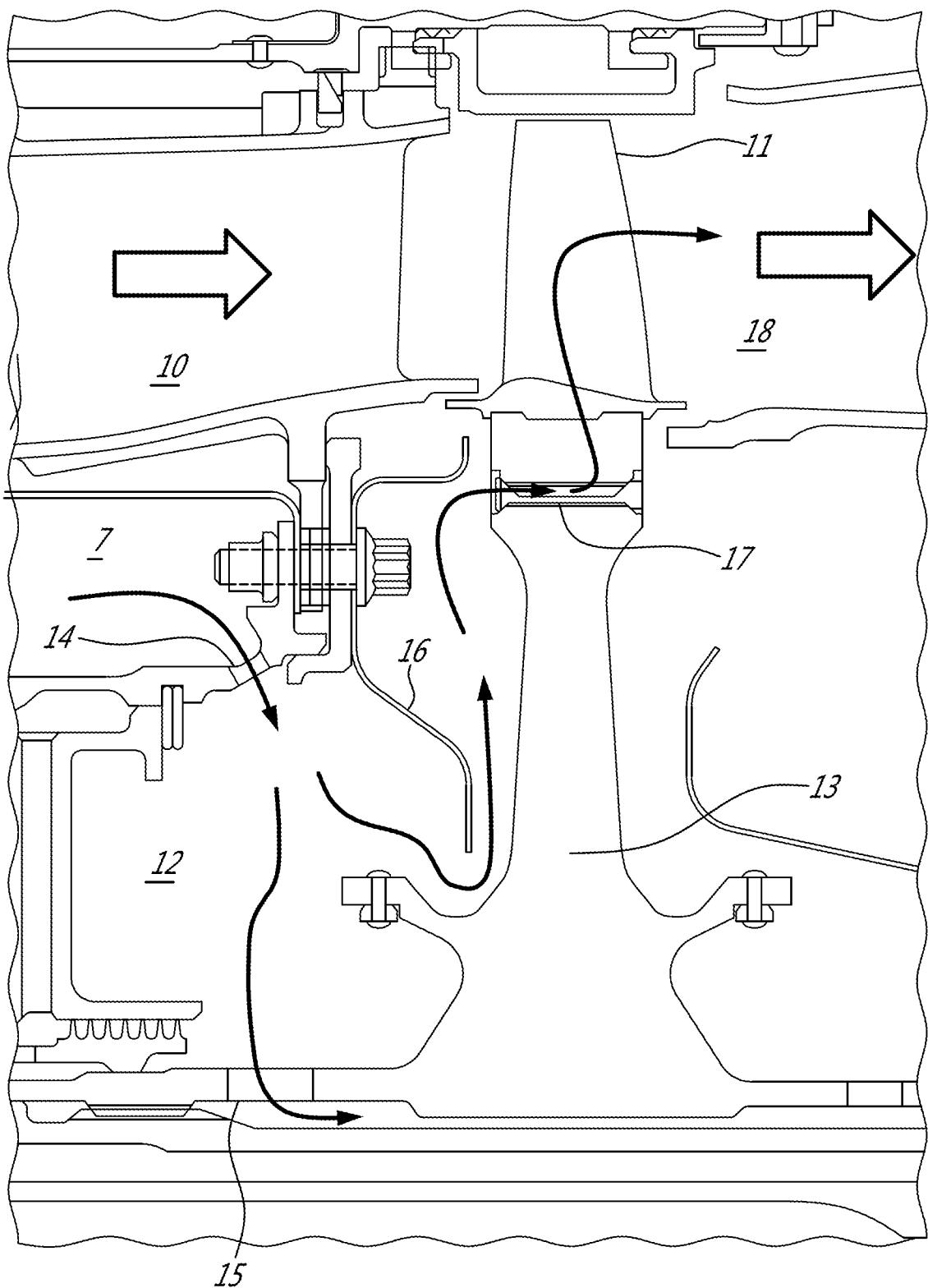
FIG. 2 is an axial cross-sectional view through the high pressure turbine section of the engine of FIG. 1, in particular showing the secondary air flow (e.g. cooling air) into the inter-stage cavity located between the nozzle guide vane and the high pressure turbine rotor.

FIG. 2 shows an axial cross-sectional view through the high pressure turbine section of the engine of FIG. 1. The inter-stage cavity 12 is located between the nozzle guide vane 10 and the high pressure turbine rotor 13. An array of turbine blades 11 is mounted on the circumference of the high pressure turbine rotor 13. As shown with arrows, core gas path air is bled from the compressor section (4-5, see FIG. 1) for use as secondary air in the secondary air systems. A portion of the secondary air is directed into the inter-stage cavity 12 through inlet openings 14. The arrows in FIG. 2 show a portion of the secondary air flow being directed to an outlet port 15 to supply air to downstream components. A portion of the secondary air flow is guided by the annular deflector 16 to impinge upon the turbine rotor 13 and then move radially outwardly toward the blade root air passage 17 to provide blade cooling air. The blade cooling air flows radially from the blade root air passage 17 into distribution and cooling channels within the interior of the turbine blade 11 to cool the blade material before exiting and mixing into the hot gas path 18 from multiple vents near the trailing edge of the turbine blade 11.

Figure 3:
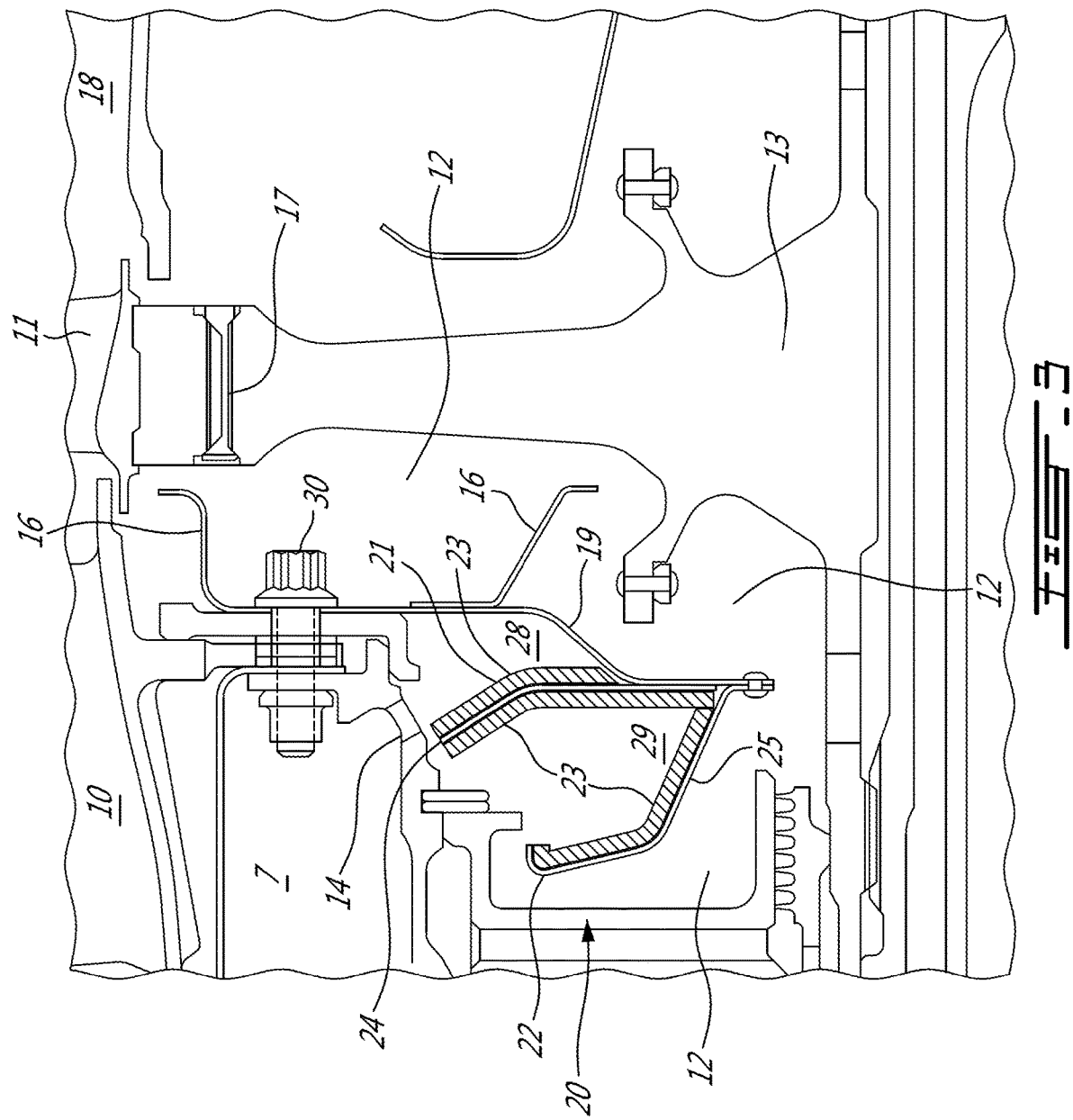
FIG. 3 is an axial cross-sectional view of a cooling air filter in accordance with the present description with two cantilevered filter panels positioned to intercept the air flow before entry into the narrow air flow channels of the turbine hub and turbine blades.
Figure 4:
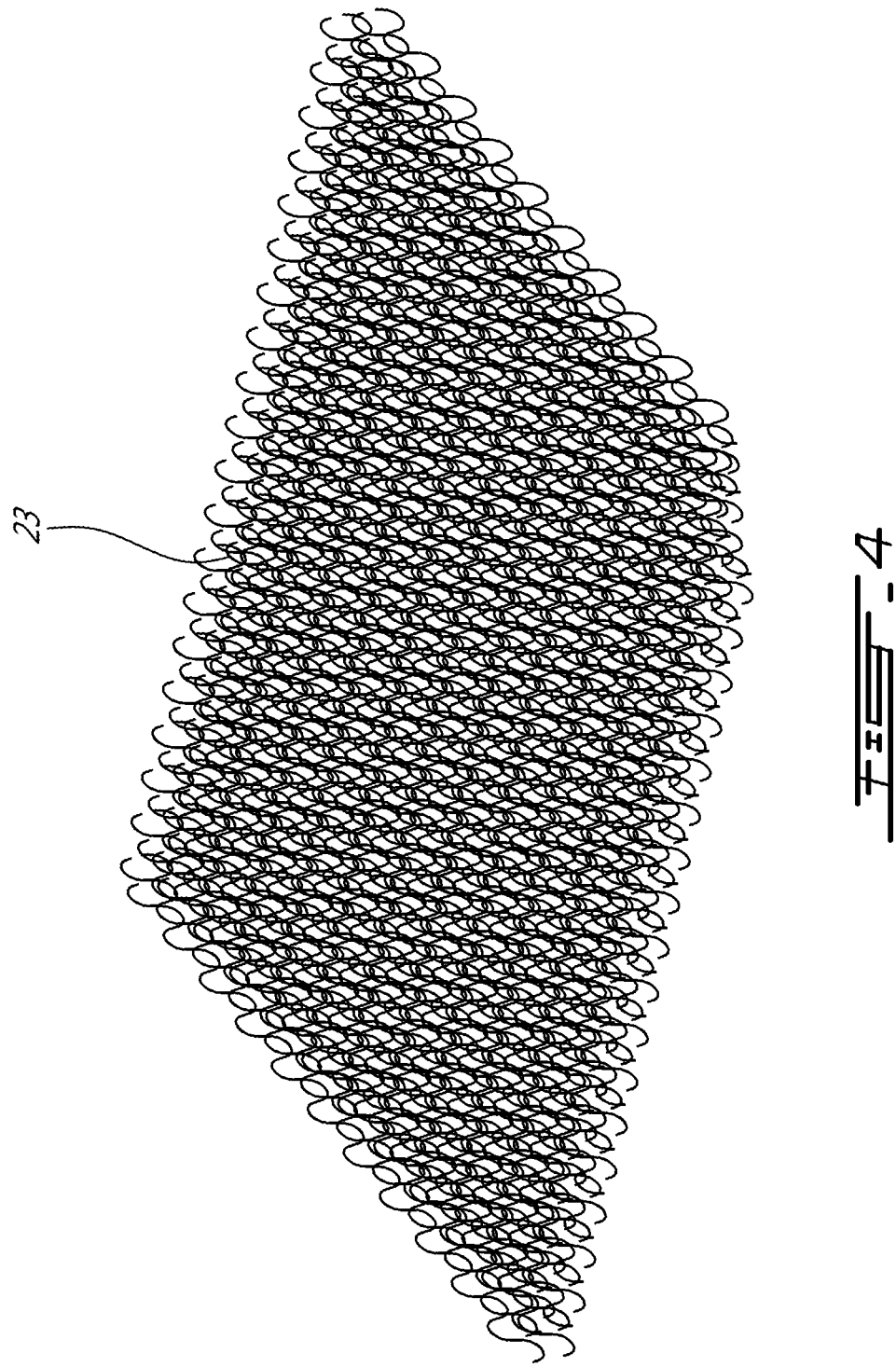
FIG. 4 is an isometric view of an example filter medium, being an undulating metal wire mesh.

FIG. 3 shows the addition of a support plate 19 to the deflector 16 on which a filter 20 is mounted to intercept and filter the secondary air flow before reaching sensitive engine components. In the example shown in FIGS. 3-7, the filter 20 has two cantilevered filter panels, namely an upstream panel 21 and a downstream panel 22 relative to a flow direction of the secondary air in the engine. FIG. 4 shows an example filter medium, being an undulating metal wire mesh 23. As seen in FIG. 3, the upstream filter panel 21 has a central perforated baffle plate 24 having two layers of mesh 23 covering both side surfaces of the baffle plate 24. The downstream filter panel 22 has a perforated baffle plate 25 having a single layer of mesh 23 covering an upstream surface only.

According to one embodiment, the support plate 19 and annular deflector 16 are not perforated. The support plate 19 and annular deflector 16 serve to direct air flow and provide a stationary structure to support the filter 20. Arrows in FIG. 5 show the cooling air flow passing from the inlet opening 14 through the upstream panel 21 (i.e.: through perforated baffle plate 24 and dual layers of mesh 23), through the downstream panel 22 (i.e.: through perforated baffle plate 25 and single layer of mesh 23), and then progressing past the annular deflector 16 towards the blade root air passage 17.

FIG. 6 shows cooling air flow once the upstream panel 21 of the filter 20 has become substantially blocked with accumulated particles or chemical contaminants. When the mesh 23 and perforated baffle plate 24 are blocked, cooling air flow is directed to bypass the upstream panel 21 via the upstream filter bypass passage 26. Since the downstream panel 22 is not blocked in FIG. 6, the cooling air flow passes through the mesh 23 and the perforated baffle plate 25 of the downstream panel 22.

FIG. 7 shows cooling air flow when both the upstream panel 21 and downstream panel 22 of the filter 20 have become substantially blocked. When the mesh 23 and perforated baffle plate 25 are blocked, cooling air flow is directed to bypass the downstream panel 22 via the downstream filter bypass passage 27. Since both the upstream panel 21 and the downstream panel 22 are blocked in FIG. 7, the cooling air flow does not pass through the filter 20. However due to the tortuous route of air flow required to pass the upstream panel 21 and downstream panel 22, vortex air currents are formed in the air flow contained within the upstream and downstream particulate traps 28, 29. Due to their mass, solid particles within the air flow will tend to be expelled outwardly by the vortex patterned air flow or toroidal flow within the upstream and downstream particulate traps 28, 29. Particles can be trapped by interaction with the rough surface and voids of the mesh 23 covering the exterior of the panels 21, 22.

Referring to FIG. 3, the gas turbine engine has an air flow path communicating between a source of pressurized cooling air (compressors 4, 5) and the turbine rotor 13 with air cooled blades 11. In the example illustrated, the air flow path passes through the inter-stage cavity 12, commencing with the inlet opening 14 and including the blade root air passage 17. The filter 20 is disposed on the support plate 19 mounted with a bolt 30 to a stationary wall of the air flow path upstream from the turbine rotor 13. The filter 20 includes perforated baffle plates 24, 25 and the surfaces support layers of mesh 23. The mesh 23 and perforated baffle plates 24, 25 include openings of a size selected for capturing suspended particles from the cooling air flow and/or a filter surface material for binding with chemical contaminants. The filter surface material can include a catalyst, a reactive binder, an electrostatic charge, or an adhesive. In the event that the mesh 23 and perforated baffle plates 24, 25 become blocked with particles or accumulated chemical contaminants, the upstream panel 21 and downstream panel 22 are spaced from the outer wall of the inter-stage cavity 12 by an upstream filter bypass passage 26 and a downstream filter bypass passage 27 respectively (see FIGS. 5-7). FIGS. 5-7 show the progressive changes in cooling air flow that occur when the filter medium mesh 23 becomes progressively blocked with suspended fine particulate matter and chemical contaminants. FIG. 5 shows the cantilevered upstream and downstream panels 21, 22 when fully clear with air flow passing through both panels 21, 22. FIG. 6 shows the air flow when the upstream filter panel 21 is blocked. FIG. 7 shows when both downstream and upstream filter panels 21, 22 are blocked and the cooling air pass through the upstream and downstream filter bypass passages 26, 27. In all cases the bypass passages 26, 27 are disposed between a radially outer edge of the cantilevered upstream and downstream panels 21, 22 and the interior wall of the air flow path.

The filter 20 extends from a stationary support plate 19. An annular deflector 16 may be used with bolt 30 to secure the filter 20 extending transverse to the direction of air flow (see arrows). As seen in FIG. 5, the air flow abruptly changes direction between the inlet opening 14 and passing through the upstream panel 21 of the filter 20. Particles in the air flow will tend to be separated from the air by centrifugal force when air flow changes direction. Accordingly as seen in FIG. 3, an upstream particulate trap 28 is defined between the upstream panel 21 of the filter 20 and the stationary support plate 19. A downstream particulate trap 29 is defined between at the cantilevered panels of the filter 20, namely between the upstream panel 21 and the downstream panel 22.

In the example illustrated, the filter 20 is disposed in the inter-stage disc cavity 12 between the nozzle guide vane 10 and the turbine rotor 13. The filter 20 includes a pair of perforated baffle plates 24, 25 and a filter medium mesh 23 mounted to each perforated baffle plate 24, 25. An example of a filtering mesh 23 is shown in FIG. 4 in the form of an undulating metal wire chain linkage. However the filtering mesh 23 can also be selected from: a woven mesh; a non-woven fabric; a knitted net; a perforated sheet; a welded mesh; or an open pore sintered particle layer. The material of the filtering mesh 23 may include: a metal wire; a carbon fibre; a plastic fibre; a ceramic material; or a plastic material.

The above described exemplary filter 20 provides a method for removing fine particulate matter and chemical contaminants from cooling air in a gas turbine engine. The fine particulate matter and chemical contaminants are suspended in a cooling air flow passing through an airflow path in flow communication with turbine components such as the turbine rotor 13 and blades 11. The fine particulate matter and chemical contaminants are trapped by filtering at least a first portion of the cooling air through the filter 20 disposed in the inter-stage cavity 12. A second portion of the cooling air may bypass the filter 20 via an upstream filter bypass passage 26 and/or a downstream filter bypass passage 27.

The filter 20 includes two cantilevered panels 21, 22 that define an annular channel or downstream particulate trap 29. A filtering mesh 23 is provided on both the upstream panel 21 and downstream panel 22. As seen in FIGS. 5-7, the directing the cooling air into the inter-stage cavity 12, including the annular channel or downstream particulate trap 29, creates swirling the cooling air in a toroid vortex pattern (dashed arrows) generated within the particulate traps 28, 29.

Dashed arrow lines show swirling of the cooling air in a vortex generated within the upstream particulate trap 28 and within the downstream particulate trap 29. When the upstream cantilevered panel 21 of the filter 20 is substantially blocked by the fine particulate matter and the chemical contaminants, as seen in FIG. 6, cooling air is conveyed downstream via the upstream filter bypass passage 26 toward the downstream cantilevered panel 22 of the filter 20. A coating may be applied to the mesh 23 and perforated baffle plates 24, 25 of the filter 20. The coating may be a material adapted to bind with the chemical contaminants found in the cooling air flow. The mesh material may be made of or coated with a material which chemically interacts with chemical contaminants present in the secondary air.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

What is claimed is:

1. An aircraft engine comprising:
   a core gas path having an air inlet;
   a compressor fluidly connected to the air inlet of the core gas path;
   a turbine fluidly connected to the compressor via the core gas path;
   a secondary air system (SAS) having an air flow path communicating between the compressor and the turbine; and
   a filter disposed in the air flow path upstream from the turbine, the filter having at least one of: openings of a size selected for capturing suspended particles; and a filter surface material for binding with chemical contaminants, wherein the filter includes a plurality of cantilevered panels.

2. The aircraft engine according to claim 1 further comprising a filter bypass passage disposed between the filter and an interior wall of the air flow path.

3. The aircraft engine according to claim 1 wherein the filter extends from a stationary support structure, the filter extending transverse to a direction of air flow and defining a first particulate trap between the filter and the stationary support structure.

4. The aircraft engine according to claim 2 wherein a second particulate trap is defined between at least one pair of the plurality of cantilevered panels.

5. The aircraft engine according to claim 4 wherein the filter bypass passage is disposed between a radially outer edge of the plurality of cantilevered panels and the interior wall of the air flow path.

6. The aircraft engine according to claim 1 wherein the filter is disposed in an inter-stage disc cavity between a nozzle guide vane and a turbine rotor.

7. The aircraft engine according to claim 1 wherein the filter includes a perforated baffle plate and a filter medium mounted to the baffle plate.

8. The aircraft engine according to claim 1 wherein the filter includes a filtering medium, selected from the group consisting of: a woven mesh; a non-woven fabric; a knitted net; a perforated sheet; a welded mesh; and a sintered particle layer.

9. The aircraft engine according to claim 8 wherein the filtering medium is selected from the group consisting of: a metal wire; a carbon fibre; a plastic fibre; a ceramic material; and a plastic material.

* * * * *